Sept. 2, 1947.  C. LIBMAN ET AL  2,426,939
ELECTRIC HEATER AND VAPORIZER
Filed Dec. 19, 1945

INVENTORS
CHARLES LIBMAN
BY WILLIAM A. GRIBBLE
Hazard & Miller
Attorneys

Patented Sept. 2, 1947

2,426,939

UNITED STATES PATENT OFFICE 2,426,939

ELECTRIC HEATER AND VAPORIZER

Charles Libman and William A. Gribble,
Los Angeles, Calif.

Application December 19, 1945, Serial No. 636,032

5 Claims. (Cl. 219—38)

1

This invention relates to improvements in electric space heaters.

An object of the invention is to provide an improved electric space heater which has associated therewith a means for vaporizing water so that as the heat heats the atmosphere in a compartment or room that the relative humidity of the atmosphere may be maintained or increased.

More specifically an object of the invention is to provide an electric heater consisting of a water reservoir with one or more tubular heating element supports suitably mounted thereon with their interiors open to the water reservoir and having heating elements mounted on the exterior thereof with means for discharging water in a finely divided or atomized condition on the interior of the heating element supports so as to be vaporized by the heat thereof enabling the water vapor to issue from the top of the supports and any excess water to drain back into the water reservoir. In this manner water vapor may be developed by the heat of the heating elements and issue into the atmosphere heating it by the heating elements to maintain or increase the humidity and overcome the objection of most electric heaters which heat the air without altering the humidity and consequently give the impression of drying.

Figure 1:
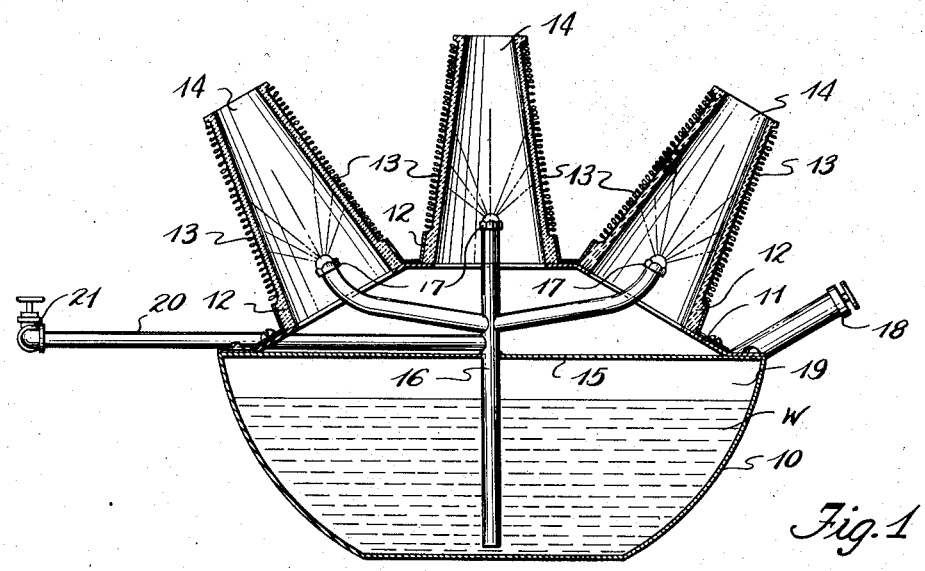
Figure 2:
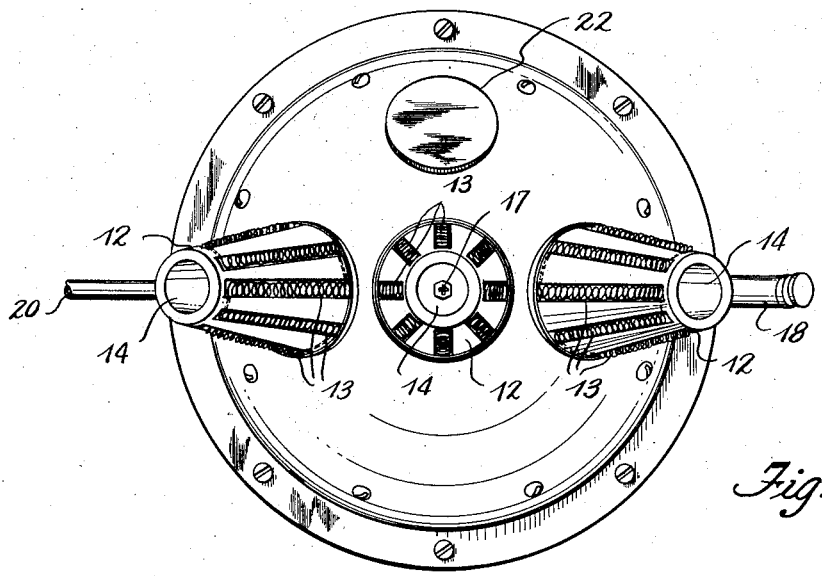

With the foregoing and other objects in view, which will be made manifest in the following detailed description and specifically pointed out in the appended claims, reference is had to the accompanying drawings for an illustrative embodiment of the invention, wherein:

Figure 1 is a sectional view of the electric heater embodying the present invention; and Fig. 2 is a top plan view of the same.

Referring to the accompanying drawings wherein similar reference characters designate similar parts throughout, the improved electric heater comprises a suitable container 10 constituting a reservoir for water W. This container has a cover 11 on which one or more heating element supports 12 are mounted. The heating element supports 12 may be formed of fire clay, ceramics or any other suitable rigid heat insulating material. On their exteriors electric heating elements 13 are mounted which may be electrically connected to any suitable source of electric current in any conventional or preferred manner.

The upper ends of the supports 12 are open as indicated at 14 and the lower ends of these tubular supports are open to the interior of the reservoir above the partition 15 disposed therein. A tube 16 extends downwardly into the reservoir to adjacent the bottom thereof and this tube is provided with branches equipped with atomizing spray heads 17 disposed within the supports 12. An air pump 18 is mounted on the container 10 and when operated creates an air pressure in the air space 19 over the water W therein. This air pressure is effective to force the water up through the tube 16 and cause it to be discharged in a very fine spray on the interior of the supports 12. These supports which are heated by the heating elements 13 serve to assist in vaporizing the discharged water and the water vapor issued through the open upper ends of the support humidifying the air heated by the heating elements.

In the preferred form of construction tube 16 is also equipped with a spray pipe 20 having a valve 21 which in turn is adapted to be connected to a water supply pipe. If the heater is to be stationarily located the valve 21 is connected to any water supply pipe and the pressure of the water therein is effective to cause it to discharge in a finely divided condition from the spray head 17. On the other hand if the heater is to be transported from place to place the valve 21 is disconnected from the water supply pipe and is closed in which case the air pump 18 is utilized to develop the pressure in the water reservoir to force the water therefrom upwardly to the spray head. 22 indicates a cap that may be removed from time to time to refill the water reservoir and then be replaced.

Any excess of water that discharges from the spray heads and which is not vaporized may trickle back from the supports 12 and collect on top of the partition 15. This water wall ordinarily only collect when the heater is cold and when the heater becomes thoroughly heated the collected water is quickly vaporized into water vapor that issues from the tops of the supports 12.

From the above-described construction it will be appreciated that the improved electric heater not only adequately heats but vaporizes water to correct the humidity. As the water discharges inside of the tubular supports for the heating elements danger of short-circuiting is avoided.

Various changes may be made in the details of construction without departing from the spirit and scope of the invention as defined by the appended claims.

We claim:

1. An electric heater having an upright open-ended tubular support on the exterior of which is mounted electrical heating elements, and means for discharging water in the interior of said support.

2. An electric heater comprising a holder for water supply, and one or more upright open-ended tubular supports having electric heating elements mounted on the exterior thereof, and means for forcing water from the water supply so as to be discharged in a finely divided condition in the interiors of said tubular supports.

3. An electric heater comprising means providing a water reservoir, one or more upright open-ended tubular supports mounted thereon, electric heating elements mounted on the exteriors of the tubular supports and means for forcing water from the water reservoir so as to be discharged on the interiors of said tubular supports.

4. An electric heater comprising a plurality of upstanding open-ended tubular supports having electric heating elements mounted on the exterior thereof, sprays arranged to discharge on the interiors of said supports and means for discharging water through said sprays.

5. An electric heater comprising a plurality of upstanding tubular supports having electric heating elements mounted on the exterior thereof, sprays arranged to discharge on the interiors of said supports and means for discharging water through said sprays comprising a closed container adapted to contain a supply of water, a tube leading from the sprays into the water therein and an air pump for developing air pressure over the water in said container.

CHARLES LIBMAN.
W. A. GRIBBLE.

REFERENCES CITED

The following references are of record in the file of this patent:

UNITED STATES PATENTS

| Number | Name | Date |
|---|---|---|
| 1,973,973 | Bookman | Sept. 18, 1934 |
| 1,081,463 | Pentz | Dec. 16, 1913 |
| 2,170,551 | Cummings, Jr. | Aug. 22, 1939 |
| 1,594,087 | Arnold | July 27, 1926 |
| 809,839 | Payne | Jan. 9, 1906 |